US012043081B2

(12) United States Patent
Paci et al.

(10) Patent No.: US 12,043,081 B2
(45) Date of Patent: Jul. 23, 2024

(54) AIR CONDITIONING APPARATUS FOR RECREATIONAL VEHICLES

(71) Applicant: Dometic Sweden AB, Solna (SE)

(72) Inventors: Enrico Paci, Forlì (IT); Andrea Cipressini, Forlì (IT)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 17/768,781

(22) PCT Filed: Oct. 15, 2020

(86) PCT No.: PCT/IB2020/059701
§ 371 (c)(1),
(2) Date: Apr. 13, 2022

(87) PCT Pub. No.: WO2021/074841
PCT Pub. Date: Apr. 22, 2021

(65) Prior Publication Data
US 2024/0100907 A1    Mar. 28, 2024

(30) Foreign Application Priority Data
Oct. 17, 2019  (IT) .......................... 102019000019193

(51) Int. Cl.
*B60H 1/00*       (2006.01)
*B60H 1/32*       (2006.01)

(52) U.S. Cl.
CPC ..... *B60H 1/00364* (2013.01); *B60H 1/00978* (2013.01); *B60H 1/3217* (2013.01); *B60H 2001/3238* (2013.01)

(58) Field of Classification Search
CPC ............ B60H 1/00364; B60H 1/00978; B60H 1/3217; B60H 2001/3238
(Continued)

(56) References Cited

U.S. PATENT DOCUMENTS

| 964,146 A | 7/1910 | Clark |
| RE24,637 E | 4/1959 | Wulle |

(Continued)

FOREIGN PATENT DOCUMENTS

| AU | 367405 | 3/2016 |
| AU | 201612249 | 5/2016 |

(Continued)

OTHER PUBLICATIONS

Non-Final Office Action issued in U.S. Appl. No. 16/763,459 mailed on Sep. 14, 2022.
(Continued)

*Primary Examiner* — Claire E Rojohn, III
(74) *Attorney, Agent, or Firm* — Dinsmore & Shohl LLP (57) ABSTRACT

An air conditioning apparatus for recreational vehicles comprises a refrigeration circuit for circulating a refrigerant fluid, said refrigeration circuit including: a condenser, an expansion valve, an evaporator, in heat exchange with a room of the recreational vehicle to be air-conditioned, a compressor, and a leakage detection system, including: a refrigerant fluid sensor, configured to detect a control parameter representative of a physical condition of the refrigerant fluid at the outlet of the evaporator or at the inlet of the condenser; a control unit, connected to the refrigerant fluid sensor, and to the compressor.

15 Claims, 2 Drawing Sheets

(58) Field of Classification Search
USPC .......................................................... 62/129
See application file for complete search history.

(56) References Cited

U.S. PATENT DOCUMENTS

| | | | |
|---|---|---|---|
| 2,973,795 A | 3/1961 | Wyman | |
| 3,092,009 A | 6/1963 | Goettl | |
| 3,115,082 A | 12/1963 | Sanoff | |
| 3,528,359 A | 9/1970 | Sand | |
| 3,680,468 A | 8/1972 | Schueler | |
| D226,381 S | 2/1973 | Harty | |
| 3,727,537 A | 4/1973 | Harty | |
| 3,867,486 A | 2/1975 | Nagele | |
| 3,974,755 A | 8/1976 | Honmann | |
| 4,189,987 A | 2/1980 | Am berg et al. | |
| D257,637 S | 12/1980 | Armbruster | |
| 4,262,212 A | 4/1981 | Jacob et al. | |
| 4,346,755 A | 8/1982 | Alley et al. | |
| 4,499,385 A | 2/1985 | Slavik | |
| 4,502,368 A | 3/1985 | Hempel | |
| 4,502,467 A | 3/1985 | Smith | |
| 4,502,888 A | 3/1985 | Leng et al. | |
| 4,550,648 A | 11/1985 | Eagle | |
| D284,025 S | 5/1986 | Armstrong | |
| 4,586,484 A | 5/1986 | Mossbach | |
| 4,590,917 A | 5/1986 | Mossbach | |
| 4,608,834 A | 9/1986 | Rummer | |
| 4,637,299 A | 1/1987 | Harding | |
| 4,641,502 A | 2/1987 | Aldrich et al. | |
| 4,646,535 A | 3/1987 | Matsuoka et al. | |
| 4,662,350 A | 5/1987 | Mossbach | |
| 4,665,804 A | 5/1987 | Muyasaka | |
| 4,672,818 A | 6/1987 | Roth | |
| 4,690,040 A | 9/1987 | Barnett | |
| 4,693,174 A | 9/1987 | Anderson | |
| 4,709,623 A | 12/1987 | Roth et al. | |
| D296,583 S | 7/1988 | Barradas | |
| 4,760,773 A | 8/1988 | Pezzulli | |
| D300,777 S | 4/1989 | Bales et al. | |
| D306,341 S | 2/1990 | Bales et al. | |
| 5,054,377 A | 10/1991 | Mochel et al. | |
| 5,056,262 A | 10/1991 | Schvveiss et al. | |
| 5,176,570 A | 1/1993 | Leidl | |
| 5,214,918 A | 6/1993 | Oguni | |
| D343,894 S | 2/1994 | Anderson | |
| 5,307,645 A | 5/1994 | Pannell | |
| 5,366,149 A | 11/1994 | Kline | |
| 5,374,215 A | 12/1994 | Crider et al. | |
| 5,403,183 A | 4/1995 | Andersson et al. | |
| D360,681 S | 7/1995 | Chopko | |
| 5,435,781 A | 7/1995 | Kitchens | |
| D367,524 S | 2/1996 | Waldschmidt et al. | |
| 5,494,244 A | 2/1996 | Walton | |
| 5,501,634 A | 3/1996 | Wilder | |
| 5,531,641 A | 7/1996 | Aldrich et al. | |
| 5,556,335 A | 9/1996 | Holyoake | |
| 5,568,732 A | 10/1996 | Isshiki et al. | |
| 5,588,910 A | 12/1996 | Nutter et al. | |
| 5,632,156 A | 5/1997 | Takeo et al. | |
| 5,643,081 A | 7/1997 | Klein | |
| D391,632 S | 3/1998 | Thomas | |
| 5,727,998 A | 3/1998 | Kreuger et al. | |
| 5,752,877 A | 5/1998 | Sun | |
| 5,765,383 A | 6/1998 | Inoue | |
| 5,771,704 A | 6/1998 | Nakajima et al. | |
| 5,860,856 A | 1/1999 | Teich et al. | |
| 5,863,310 A | 1/1999 | Brown et al. | |
| 5,964,910 A | 10/1999 | Keele | |
| D424,184 S | 5/2000 | Chang-Kwon | |
| 6,066,041 A | 5/2000 | Hernandez et al. | |
| 6,073,456 A | 6/2000 | Kawai et al. | |
| 6,076,370 A | 6/2000 | Da Silva | |
| D428,480 S | 7/2000 | Flanagan | |
| 6,101,829 A | 8/2000 | Robinson | |
| 6,149,513 A | 11/2000 | Lyu | |
| D435,639 S | 12/2000 | Slavonia et al. | |
| 6,171,062 B1 | 1/2001 | Bucher et al. | |
| D437,396 S | 2/2001 | Flanagan | |
| 6,196,914 B1 | 3/2001 | Lyu | |
| 6,205,798 B1 * | 3/2001 | Porter | G01M 3/3227 62/131 |
| 6,234,893 B1 | 5/2001 | Meredith | |
| 6,241,794 B1 | 6/2001 | Jadran et al. | |
| 6,250,373 B1 | 6/2001 | Vecchi et al. | |
| 6,257,976 B1 | 7/2001 | Richardson, III | |
| 6,302,780 B1 | 10/2001 | Ahn et al. | |
| 6,339,934 B1 | 1/2002 | Yoon | |
| D454,625 S | 3/2002 | Flanagan | |
| 6,351,957 B2 | 3/2002 | Hara | |
| 6,357,249 B1 | 3/2002 | Robinson et al. | |
| 6,367,270 B2 | 4/2002 | Niimi et al. | |
| 6,370,899 B1 | 4/2002 | Hobbs et al. | |
| 6,370,906 B1 | 4/2002 | Kuo | |
| 6,415,622 B2 | 7/2002 | Kim et al. | |
| 6,536,222 B1 | 3/2003 | Ahn et al. | |
| 6,554,880 B1 | 4/2003 | Northcutt | |
| 6,571,572 B2 | 6/2003 | Hobbs et al. | |
| 6,601,356 B2 | 8/2003 | Snyder | |
| 6,616,523 B1 | 9/2003 | Tani et al. | |
| 6,626,003 B1 | 9/2003 | Kortum et al. | |
| 6,745,586 B1 | 6/2004 | Reimann et al. | |
| D495,041 S | 8/2004 | Thomas | |
| 6,814,660 B1 | 11/2004 | Cavett | |
| 6,857,953 B2 | 2/2005 | Malott | |
| 6,889,762 B2 | 5/2005 | Zeigler et al. | |
| D514,221 S | 1/2006 | Vladika | |
| 7,086,740 B2 | 8/2006 | Sample | |
| 7,140,192 B2 | 11/2006 | Allen et al. | |
| 7,171,822 B2 | 2/2007 | Allen et al. | |
| D538,413 S | 3/2007 | Lyu et al. | |
| 7,201,010 B2 | 4/2007 | Homan et al. | |
| D541,917 S | 5/2007 | Pfeiffer | |
| 7,234,315 B2 | 6/2007 | Allen et al. | |
| 7,237,397 B2 | 7/2007 | Allen | |
| D554,544 S | 11/2007 | Englert | |
| D560,785 S | 1/2008 | Galeazzi | |
| 7,316,119 B2 | 1/2008 | Allen | |
| 7,334,834 B2 | 2/2008 | Hill et al. | |
| 7,441,414 B2 | 10/2008 | Ziehr et al. | |
| 7,448,227 B2 | 11/2008 | Zeigler et al. | |
| 7,454,922 B2 | 11/2008 | Zeigler et al. | |
| 7,558,700 B2 | 7/2009 | Yamashita et al. | |
| 7,591,143 B2 | 9/2009 | Zeigler et al. | |
| 7,591,303 B2 | 9/2009 | Zeigler et al. | |
| 7,739,882 B2 | 6/2010 | Evans et al. | |
| D619,151 S | 7/2010 | Tsuji | |
| D619,236 S | 7/2010 | Schlag et al. | |
| D619,960 S | 7/2010 | Winkler | |
| 7,797,958 B2 | 9/2010 | Alston et al. | |
| 7,832,221 B2 | 11/2010 | Wijaya et al. | |
| D629,094 S | 12/2010 | Thomas | |
| 7,845,187 B2 | 12/2010 | Patel et al. | |
| 7,851,098 B2 | 12/2010 | Schiegl et al. | |
| D636,474 S | 4/2011 | Choi et al. | |
| 7,934,387 B2 | 5/2011 | Lee et al. | |
| 7,963,117 B2 | 6/2011 | Allen et al. | |
| 8,015,833 B2 | 9/2011 | Cikanek et al. | |
| 8,096,482 B2 | 1/2012 | Dage | |
| 8,113,047 B2 | 2/2012 | Volkwein et al. | |
| D657,032 S | 4/2012 | Chouji | |
| D657,033 S | 4/2012 | Chouji | |
| D657,034 S | 4/2012 | Chouji | |
| D657,036 S | 4/2012 | Vetu et al. | |
| D657,857 S | 4/2012 | Choi | |
| 8,171,866 B2 | 5/2012 | Dunstan | |
| D661,386 S | 6/2012 | Bergin | |
| 8,249,749 B2 | 8/2012 | Dage et al. | |
| D672,450 S | 12/2012 | Milks et al. | |
| 8,453,722 B2 | 6/2013 | Zeigler et al. | |
| 8,535,127 B2 | 9/2013 | Malott | |
| D691,059 S | 10/2013 | Fechner et al. | |
| 8,568,209 B2 | 10/2013 | Boxum | |
| D692,786 S | 11/2013 | Fechner et al. | |
| D707,446 S | 6/2014 | Svahn | |

(56) References Cited

U.S. PATENT DOCUMENTS

| | | |
|---|---|---|
| D709,604 S | 7/2014 | Qin et al. |
| D712,531 S | 9/2014 | Bergin |
| D715,907 S | 10/2014 | Bergin |
| D716,925 S | 11/2014 | Bergin |
| D717,719 S | 11/2014 | Sagen |
| 8,883,370 B2 | 11/2014 | Schiegl et al. |
| 8,915,317 B2 | 12/2014 | Aemisegger et al. |
| 8,989,941 B2 | 3/2015 | Aemisegger et al. |
| D726,295 S | 4/2015 | Kim et al. |
| 9,033,072 B2 | 5/2015 | Aemisegger et al. |
| D746,217 S | 12/2015 | Gruner |
| D751,184 S | 3/2016 | Farone et al. |
| D754,319 S | 4/2016 | Park et al. |
| 9,395,228 B2 | 7/2016 | Molitor et al. |
| D778,418 S | 2/2017 | Bu et al. |
| 9,577,570 B2 | 2/2017 | Thiel |
| D782,939 S | 4/2017 | Allard |
| 9,631,832 B2 | 4/2017 | Malott |
| D785,771 S | 5/2017 | Bergin et al. |
| D785,772 S | 5/2017 | Bergin et al. |
| D808,001 S | 1/2018 | Berkman et al. |
| D809,642 S | 2/2018 | Lee |
| D810,252 S | 2/2018 | Lee |
| D811,566 S | 2/2018 | Liu et al. |
| D811,568 S | 2/2018 | Terasaki et al. |
| D817,466 S | 5/2018 | Moseley |
| 9,975,405 B2 | 5/2018 | Siddiqui et al. |
| D824,387 S | 7/2018 | Oberpriller |
| D824,499 S | 7/2018 | Williamson et al. |
| 10,093,152 B2 | 10/2018 | Allard et al. |
| D832,987 S | 11/2018 | Bergin |
| D841,138 S | 2/2019 | Williamson et al. |
| D862,668 S | 10/2019 | Moseley |
| D865,926 S | 11/2019 | Moseley |
| D868,043 S | 11/2019 | Doe |
| D876,410 S | 2/2020 | Jeon et al. |
| D885,541 S | 5/2020 | Schumann |
| D895,096 S | 9/2020 | Brandenburg |
| D903,075 S | 11/2020 | Huang et al. |
| D905,217 S | 12/2020 | Hederstierna et al. |
| D907,183 S | 1/2021 | Meda et al. |
| D915,570 S | 4/2021 | Pellerin |
| D944,374 S | 2/2022 | Hederstierna et al. |
| 11,435,101 B2 * | 9/2022 | Branson ............... F24F 1/0018 |
| 11,435,102 B2 * | 9/2022 | Watanabe ............... F24F 11/62 |
| 11,578,887 B2 * | 2/2023 | Delgoshaei ............ F24F 11/36 |
| 2001/0053668 A1 | 12/2001 | Berger |
| 2002/0121100 A1 * | 9/2002 | Yabuki ................. F25B 49/005 |
| | | 62/149 |
| 2002/0170305 A1 | 11/2002 | Nakajima |
| 2003/0162492 A1 | 8/2003 | Caferro et al. |
| 2003/0220070 A1 | 11/2003 | Orendorff et al. |
| 2004/0005854 A1 | 1/2004 | Shin |
| 2004/0023089 A1 | 2/2004 | Schiegl |
| 2004/0038643 A1 | 2/2004 | Katagiri et al. |
| 2004/0072532 A1 | 4/2004 | Cho |
| 2005/0087332 A1 | 4/2005 | Umeo et al. |
| 2005/0227609 A1 | 10/2005 | Koessler |
| 2006/0026936 A1 | 2/2006 | Paumier et al. |
| 2006/0052050 A1 | 3/2006 | Malott et al. |
| 2006/0083889 A1 | 4/2006 | Schuckers |
| 2007/0000265 A1 | 1/2007 | McEnaney et al. |
| 2007/0032909 A1 | 2/2007 | Tolbert, Jr. et al. |
| 2007/0066215 A1 | 3/2007 | Song et al. |
| 2007/0131408 A1 | 6/2007 | Zeigler et al. |
| 2007/0157522 A1 | 7/2007 | Hebert et al. |
| 2007/0227693 A1 | 10/2007 | Allen et al. |
| 2007/0287374 A1 | 12/2007 | Day et al. |
| 2007/0299560 A1 | 12/2007 | LaHue et al. |
| 2008/0014852 A1 | 1/2008 | Mielke et al. |
| 2008/0029997 A1 | 2/2008 | Wickelmaier et al. |
| 2008/0034767 A1 | 2/2008 | Ziehr et al. |
| 2008/0146136 A1 | 6/2008 | Degutis et al. |
| 2008/0164850 A1 | 10/2008 | Ayana et al. |
| 2008/0314072 A1 | 12/2008 | Plank et al. |
| 2009/0098820 A1 | 4/2009 | Yabu |
| 2010/0089563 A1 | 4/2010 | Sundhar et al. |
| 2010/0224754 A1 | 9/2010 | Khan et al. |
| 2010/0288036 A1 | 11/2010 | Volkwein |
| 2011/0016894 A1 | 1/2011 | Lemon et al. |
| 2011/0067420 A1 | 3/2011 | Alston et al. |
| 2011/0302942 A1 | 12/2011 | Birchard |
| 2012/0210733 A1 | 8/2012 | Kolavennu et al. |
| 2012/0247131 A1 | 10/2012 | Esch |
| 2012/0324927 A1 | 12/2012 | Suzuki |
| 2013/0047648 A1 | 3/2013 | Zeigler et al. |
| 2013/0109294 A1 | 5/2013 | Tolinski et al. |
| 2013/0205811 A1 | 8/2013 | Esch |
| 2013/0328389 A1 | 12/2013 | Ayana et al. |
| 2014/0033742 A1 | 2/2014 | Esch |
| 2014/0110186 A1 | 4/2014 | Aemisegger et al. |
| 2014/0188313 A1 | 7/2014 | Huang |
| 2014/0223928 A1 | 8/2014 | Esch |
| 2014/0260393 A1 | 9/2014 | Siddiqui et al. |
| 2015/0013781 A1 | 1/2015 | Wickelmaier et al. |
| 2015/0087216 A1 | 3/2015 | Stover et al. |
| 2015/0107814 A1 | 4/2015 | Jeong |
| 2015/0251521 A1 | 9/2015 | Brauer et al. |
| 2015/0352924 A1 | 12/2015 | Allard et al. |
| 2016/0076271 A1 | 3/2016 | Reinking |
| 2016/0207372 A1 | 7/2016 | Parry |
| 2017/0052054 A1 | 2/2017 | Merker et al. |
| 2017/0100985 A1 | 4/2017 | Johnson et al. |
| 2017/0203632 A1 | 7/2017 | Westendarp et al. |
| 2017/0210205 A1 | 7/2017 | Mosby |
| 2017/0241561 A1 | 8/2017 | Hoeflinger |
| 2017/0355246 A1 | 12/2017 | Mathe et al. |
| 2018/0017256 A1 | 1/2018 | Jaeger |
| 2018/0017285 A1 | 1/2018 | Armbruster et al. |
| 2018/0080692 A1 * | 3/2018 | Honda ................. F25B 13/00 |
| 2018/0259235 A1 * | 9/2018 | Delgoshaei ............ F24F 11/83 |
| 2019/0047353 A1 | 2/2019 | Williamson et al. |
| 2019/0047354 A1 | 2/2019 | Williamson et al. |
| 2019/0170415 A1 * | 6/2019 | Walser ................. F25B 41/34 |
| 2019/0186769 A1 * | 6/2019 | Zimmermann ......... F25B 41/34 |
| 2019/0315197 A1 | 10/2019 | Williamson et al. |
| 2019/0331377 A1 * | 10/2019 | Matsuda ................ F25B 5/02 |
| 2019/0390877 A1 * | 12/2019 | Sakae ................. F25B 1/00 |
| 2020/0141601 A1 * | 5/2020 | Weinert ................. F25B 41/00 |

FOREIGN PATENT DOCUMENTS

| | | |
|---|---|---|
| AU | 201613590 | 7/2016 |
| AU | 201613591 | 7/2016 |
| AU | 201613592 | 7/2016 |
| AU | 201613593 | 7/2016 |
| AU | 201712794 | 5/2017 |
| AU | 201712798 | 5/2017 |
| AU | 201911094 | 4/2019 |
| AU | 201912125 | 6/2019 |
| CA | 1011592 A | 6/1977 |
| CN | 103476613 A | 12/2013 |
| CN | 304097003 S | 4/2017 |
| DE | 2613666 A1 | 10/1977 |
| DE | 69313696 T2 | 5/1998 |
| DE | 10140985 A1 | 3/2003 |
| DE | 10331044 B1 | 2/2005 |
| DE | 102007038716 A1 | 2/2009 |
| DE | 202009009910 U1 | 9/2009 |
| DE | 202011104885 U1 | 10/2011 |
| DE | 202012006081 U1 | 7/2012 |
| DE | 202012006084 U1 | 7/2012 |
| DE | 202012006085 U1 | 7/2012 |
| DE | 202012006086 U1 | 7/2012 |
| DE | 202012006087 U1 | 7/2012 |
| DE | 202012006089 U1 | 7/2012 |
| DE | 102011012089 A1 | 8/2012 |
| DE | 102011100182 A1 | 10/2012 |
| DE | 202013002717 U1 | 4/2013 |
| DE | 202013006209 U1 | 7/2013 |
| DE | 102012221424 A1 | 5/2014 |
| DE | 202011110687 U1 | 7/2015 |
| DE | 202014104787 U1 | 9/2015 |
| DE | 202016104120 U1 | 10/2017 |

(56) References Cited

FOREIGN PATENT DOCUMENTS

| | | |
|---|---|---|
| DE | 112017005196 T5 | 7/2019 |
| DE | 102019119754 B3 | 7/2020 |
| DE | 112018005883 T5 | 7/2020 |
| DE | 112020004382 T5 | 6/2022 |
| EM | 003323740-0001 | 7/2016 |
| EM | 003421643-0001 | 10/2016 |
| EP | 45491 B1 | 9/1983 |
| EP | 45946 B1 | 1/1984 |
| EP | 180053 A2 | 10/1985 |
| EP | 64769 B1 | 8/1986 |
| EP | 131872 B1 | 9/1987 |
| EP | 254760 B1 | 7/1990 |
| EP | 271783 B1 | 6/1991 |
| EP | 262546 B1 | 9/1991 |
| EP | 632237 B1 | 10/1997 |
| EP | 955529 A1 | 11/1999 |
| EP | 949455 B1 | 2/2002 |
| EP | 1079292 B1 | 5/2002 |
| EP | 1225090 A2 | 7/2002 |
| EP | 967435 B1 | 8/2003 |
| EP | 1386883 A1 | 2/2004 |
| EP | 926453 B1 | 4/2004 |
| EP | 1449690 A1 | 8/2004 |
| EP | 976990 B1 | 9/2004 |
| EP | 936420 B1 | 2/2005 |
| EP | 967436 B1 | 8/2005 |
| EP | 1108963 B1 | 9/2005 |
| EP | 1614559 A1 | 1/2006 |
| EP | 0921361 B1 | 2/2006 |
| EP | 1621818 A1 | 2/2006 |
| EP | 855556 B1 | 5/2006 |
| EP | 1130338 B1 | 5/2006 |
| EP | 1156277 B1 | 6/2006 |
| EP | 1681517 A1 | 7/2006 |
| EP | 1693623 A1 | 8/2006 |
| EP | 1681191 A3 | 5/2007 |
| EP | 1832452 A2 | 9/2007 |
| EP | 1840459 A1 | 10/2007 |
| EP | 1848057 A1 | 10/2007 |
| EP | 1892473 A2 | 2/2008 |
| EP | 1714858 B1 | 3/2008 |
| EP | 1748188 B1 | 9/2008 |
| EP | 1702835 B1 | 12/2008 |
| EP | 1693095 B1 | 1/2009 |
| EP | 1816411 A3 | 2/2009 |
| EP | 1834564 A3 | 4/2009 |
| EP | 2051006 A1 | 4/2009 |
| EP | 2110614 A1 | 10/2009 |
| EP | 1886905 B1 | 3/2010 |
| EP | 2096340 B1 | 7/2010 |
| EP | 2208661 A1 | 7/2010 |
| EP | 1623858 B1 | 9/2010 |
| EP | 1752365 B1 | 9/2010 |
| EP | 1826041 B1 | 10/2010 |
| EP | 2138386 B1 | 6/2011 |
| EP | 2116771 B1 | 8/2011 |
| EP | 2357899 A1 | 8/2011 |
| EP | 2361947 A1 | 8/2011 |
| EP | 1788320 B1 | 1/2012 |
| EP | 2409903 A1 | 1/2012 |
| EP | 1714859 B2 | 4/2012 |
| EP | 1703355 B1 | 5/2012 |
| EP | 2131172 B1 | 5/2012 |
| EP | 1848058 B1 | 10/2012 |
| EP | 1688656 B1 | 12/2012 |
| EP | 2559978 A1 | 2/2013 |
| EP | 2028419 A3 | 6/2013 |
| EP | 2200114 B1 | 10/2013 |
| EP | 2629273 A3 | 12/2013 |
| EP | 2669124 A1 | 12/2013 |
| EP | 2669154 A2 | 12/2013 |
| EP | 2669155 A2 | 12/2013 |
| EP | 2722203 A1 | 4/2014 |
| EP | 2722215 A2 | 4/2014 |
| EP | 2722219 A2 | 4/2014 |
| EP | 2722262 A2 | 4/2014 |
| EP | 2722263 A2 | 4/2014 |
| EP | 2723044 A1 | 4/2014 |
| EP | 2527173 B1 | 10/2014 |
| EP | 2354653 B1 | 11/2014 |
| EP | 2551173 B1 | 3/2015 |
| EP | 2439434 B1 | 7/2015 |
| EP | 2423019 B1 | 8/2015 |
| EP | 2910457 A1 | 8/2015 |
| EP | 2918483 A2 | 9/2015 |
| EP | 2214239 B1 | 11/2015 |
| EP | 2413409 B1 | 11/2015 |
| EP | 2423013 B1 | 11/2015 |
| EP | 2290290 B1 | 12/2015 |
| EP | 2508397 B1 | 3/2016 |
| EP | 3006863 A1 | 4/2016 |
| EP | 3081463 A1 | 10/2016 |
| EP | 3121042 A1 | 1/2017 |
| EP | 3128299 A1 | 2/2017 |
| EP | 3163741 A1 | 5/2017 |
| EP | 3165433 A1 | 5/2017 |
| EP | 3255360 B1 | 12/2017 |
| EP | 3315880 A1 | 5/2018 |
| FR | 2087220 A7 | 12/1971 |
| FR | 2825325 A1 | 12/2002 |
| GB | 2297157 A | 7/1996 |
| GB | 2553972 A | 3/2018 |
| IN | 52/2017 A | 12/2017 |
| IT | 1314776 B1 | 1/2003 |
| IT | 20030006 A1 | 2/2005 |
| IT | 1343133 B | 11/2007 |
| IT | 20060143 A1 | 11/2007 |
| IT | 20080283 A1 | 8/2008 |
| IT | 20080282 A1 | 11/2009 |
| IT | 20090020 A1 | 8/2010 |
| IT | 20090180 A1 | 9/2010 |
| IT | 20090109 A1 | 11/2010 |
| IT | 20110130 A1 | 5/2013 |
| JP | S52137854 A | 11/1977 |
| JP | H04-257675 A | 9/1992 |
| JP | 2001180254 A | 7/2001 |
| JP | 2004-125338 A | 4/2004 |
| JP | 2009127950 A | 6/2009 |
| KR | 10-2005-0119747 A | 12/2005 |
| WO | 1992020975 A1 | 11/1992 |
| WO | 9815790 A1 | 4/1998 |
| WO | 9965554 A1 | 12/1999 |
| WO | 200211221 A2 | 2/2002 |
| WO | 2004099681 A1 | 11/2004 |
| WO | 2005108882 A2 | 11/2005 |
| WO | 2006025880 A1 | 3/2006 |
| WO | 2006025880 A2 | 3/2006 |
| WO | 2007014721 A1 | 2/2007 |
| WO | 2008154975 A1 | 12/2008 |
| WO | 2011076355 A1 | 6/2011 |
| WO | 2012119743 A1 | 9/2012 |
| WO | 2012138497 A1 | 10/2012 |
| WO | 2013119489 A2 | 8/2013 |
| WO | 2015191029 A1 | 12/2015 |
| WO | 2017032698 A1 | 3/2017 |
| WO | 2017087628 A1 | 5/2017 |
| WO | 2017108289 A1 | 6/2017 |
| WO | 2019097448 A1 | 5/2019 |

OTHER PUBLICATIONS

Office Action Issued in German Application No. 102020209854.90 mailed on Aug. 10, 2022.
Office Action Issued in German Application No. 102020209854.90 mailed on Dec. 16, 2022.
Decision to Grant Issued in German Application No. 102020209854.90 mailed on Jan. 26, 2023.
Restriction Requirement mailed on Apr. 13, 2020, received for Design U.S. Appl. No. 29/682,265, filed Mar. 4, 2019.
Italian Search Report and Written Opinion for Italian Application No. IT201900014247 on Apr. 14, 2020.
Truma., "Aventa Comfort (Australia) Operating Instructions Installation Instructions," 2013, pp. 1-16.

(56) References Cited

OTHER PUBLICATIONS

German Application No. 102020209854.9 filed on Aug. 5, 2020.
Notice of Allowance in Design U.S. Appl. No. 29/682,265 mailed on Aug. 10, 2020.
Notice of Allowance in Design U.S. Appl. No. 29/604,433 mailed on Aug. 14, 2020.
Notice of Allowance in Design U.S. Appl. No. 29/682,265 mailed on Aug. 27, 2020.
Notice of Allowance in Design U.S. Appl. No. 29/604,433 mailed on Sep. 18, 2020.
Notice of Allowance in Design U.S. Appl. No. 29/682,265 mailed on Oct. 23, 2020.
Notice of Allowance in Design U.S. Appl. No. 29/604,433 mailed on Nov. 17, 2020.
Italian Application No. 102017000131339 filed on Nov. 16, 2017.
Design U.S. Appl. No. 29/760,605, filed Dec. 2, 2020.
Notice of Allowance in Design U.S. Appl. No. 29/604,433 mailed on Nov. 30, 2020.
Italian App. No. PG2014A000058 filed Dec. 2, 2014 titled Rotary Device for Reconfiguring Microwave Components in Cavity or Waveguide.
U.S. Appl. No. 17/252,506 titled "Heating, Ventilation and Air Conditioning System With Illumination" filed Dec. 15, 2020.
U.S. Appl. No. 63/141,800 titled "Air Conditioning System for a Vehicle" filed Jan. 26, 2021.
Design U.S. Appl. No. 29/767,929 titled "Air Conditioning Housing" filed Jan. 26, 2021.
Design U.S. Appl. No. 29/774,535 titled "Air Distribution Box" filed Mar. 17, 2021.
U.S. Appl. No. 17/205,719 titled "Heating, Ventilation and Air Conditioning System With Illumination" filed Mar. 18, 2021.
U.S. Appl. No. 63/175,304 titled "Mobile Air Conditioner" filed Apr. 15, 2021.
Australian Patent Application No. 2020365568 filed on Mar. 31, 2022.
German Patent Application No. 11202004382.7 filed on Apr. 13, 2022.
Notice of Allowance issued in U.S. Appl. No. 16/763,459 mailed on Mar. 2, 2023.
Office Action issued in CN Application No. 201880073547.0 mailed on Mar. 6, 2023.
Patent Certificate Issued in German Application No. 102020209854.90 mailed on May 4, 2023.
Corrected Notice of Allowability issued in U.S. Appl. No. 16/763,459 mailed on Jun. 9, 2023.
Notice of Allowance issued in U.S. Appl. No. 16/763,459 mailed on May 30, 2023.
10-Minute Tech, Trailer Life, Jul. 1996, pp. 69-70 dated Jul. 1, 1996.
"American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014".
"American RV Company, Dometic 541815 High Performance 13,500 BTU Air Conditioner Upper Unit CCC2 Required Electronics Pre-Installed Camper Trailer RV,https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014".
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine Off; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/gb/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591) International Search Report and Written Opinion for PCT/US2013/065458 dated Jan. 29, 2014.
International Search Report and Written Opinion for PCT/US2013/065458 dated Jan. 29, 2014.
EU Design Patent Application No. 000965843-0001-000965843-0004 filed on Jul. 7, 2008.
EU Design Patent Application No. 000990270-0001-000990270-0003 filed on Aug. 22, 2008.
EU Design Patent Application No. 001662826-0001-001662826-0005 filed on Jan. 29, 2010.
EU Design Patent Application No. 001765082-0001-001765082-0002 filed on Oct. 7, 2010.
EU Design Patent Application No. 001906751-0001-001906751-0024 filed on Aug. 22, 2011.
EU Design Patent Application No. 001964909-0001-001964909-0018 filed on Dec. 19, 2011.
EU Design Patent Application No. 001966136-0001-001966136-0004 filed on Dec. 21, 2011.
EU Design Patent Application No. 002081919-0001-002081919-0002 filed on Jul. 31, 2012.
EU Design Patent Application No. 002088500-0001-002088500-0004 filed on Aug. 16, 2012.
Design U.S. Appl. No. 29/660,094, filed Aug. 17, 2018.
Design U.S. Appl. No. 29/620,394, filed Oct. 4, 2017.
Design U.S. Appl. No. 29/645,887, filed Apr. 30, 2018.
U.S. Appl. No. 62/819,711, filed Mar. 18, 2019.
Design U.S. Appl. No. 29/677,547, filed Jan. 22, 2019.
U.S. Appl. No. 16/744,584, filed Jan. 16, 2020.
Dometic Product Catalog, Climate Control, 2015.
Dometic Product Catalog, Climate Control, 2016.
Italian Application No. 102019000019193 filed on Oct. 17, 2019.
Restriction Requirement mailed on Apr. 13, 2020, received for Design U.S. Appl. No. 29/604,433, filed May 17, 2017.
Canadian Intellectual Property Office, Office Action for App. No. 167431 dated Oct. 8, 2016.
European Patent Office, International Search Report and Written Opinion for PCT/IB2020/059701 mailed Nov. 30, 2020, 15 pages.
Italian Search Report and Written Opinion for Italian Application No. 102019000019193 on Jun. 26, 2020.
PCT Application No. PCT/IB2020/059701 titled "Air Conditioning Apparatus for Recreational Vehicles" filed on Oct. 15, 2020.
Australian Patent Application No. 2018366469 titled "Air Conditioning Apparatus for Recreational Vehicles" Filed on May 6, 2020.

(56) References Cited

OTHER PUBLICATIONS

Chinese Patent Application No. 201880073547 titled "Air Conditioning Apparatus for Recreational Vehicles" filed on May 13, 2020.
Notice of Grant Issued in Italian Application No. 102017000131339 mailed on Feb. 5, 2019.
Notice of Allowance in Design U.S. Appl. No. 29/760,605 mailed on Jul. 22, 2021.
Notice of Grant Issued in Italian Application No. IT102019000014247 mailed on Jul. 29, 2021.
Notice of Allowance in Design U.S. Appl. No. 29/760,605 mailed on May 26, 2021.
Corrected Notice of Allowance in Design U.S. Appl. No. 29/760,605 mailed on Aug. 18, 2021.
Corrected Notice of Allowance in Design U.S. Appl. No. 29/760,605 mailed on Sep. 1, 2021.
International Search Report Issued in PCT Application No. PCT/IB2020/059701 mailed on Nov. 30, 2020.
U.S. Appl. No. 16/763,459, filed May 12, 2020.
Notice of Grant Issued in Italian Application No. 102019000019193 mailed on Sep. 27, 2021.
Notice of Allowance in Design U.S. Appl. No. 29/760,605 mailed on Oct. 14, 2021.
Corrected Notice of Allowance in Design U.S. Appl. No. 29/760,605 mailed on Oct. 28, 2021.
Office Action Issued in German Application No. 112018005883.2 mailed on Feb. 8, 2022.
Office Action issued in CN Application No. 201880073547.0 mailed on Nov. 21, 2023.

\* cited by examiner

AIR CONDITIONING APPARATUS FOR RECREATIONAL VEHICLES

CLAIM TO PRIORITY

This 35 U.S.C. § 371 National Stage Patent application claims priority to and benefit of PCT Patent Application No. PCT/162020/059701, filed Oct. 15, 2020, which claims priority to and benefit of Italian Patent Application Serial Number IT 102019000019193 filed Oct. 17, 2019, all of which is incorporated by reference herein.

TECHNICAL FIELD

Present embodiments relate to an air conditioning apparatus for recreational vehicles; moreover, but without limitation the present embodiments relate to a recreational vehicle and to a method for supplying conditioned air in a recreational vehicle.

BACKGROUND ART

Air conditioning apparatuses for recreational vehicles usually comprise a refrigeration circuit for a refrigerant fluid, a condenser, an expansion device, an evaporator, a compressor and an electric motor for driving the compressor.

In particular, field of the present patent application is leakage detection of the refrigerant fluid in refrigeration system. In fact, the diffusion of natural refrigerant fluids, which are potentially explosive and/or toxic, made it essential to promptly detect a leakage of the refrigerant fluid, before it produces fires or explosions.

Leakage detections systems for refrigerant fluid are known, for example, from the following patent documents: EP3255360B1, WO2006025880A1, WO2013119489A2, U.S. Pat. No. 5,214,918A, GB2553972A, WO2013/119489A2, U.S. Pat. No. 7,558,700B2. The known systems have a limited reliability and rapidity in detecting leakages. Moreover, their architecture is complex.

DISCLOSURE OF THE INVENTION

Present embodiments provide an air conditioning apparatus for a recreational vehicle and a method for detecting a leakage of refrigerant fluid in a refrigeration circuit for a recreational vehicle, which improves the above mentioned prior art.

This scope is achieved by the air conditioning apparatus and the method according to one or more of the appended claims.

The present disclosure relates to an air conditioning apparatus for recreational vehicles. The air conditioning apparatus (in the following: the apparatus) comprises a refrigerant fluid. The refrigerant fluid may be a natural refrigerant fluid, such as, for example, carbon dioxide ($CO_2$, R-744), propane (R-290), isobutane (R-600a), propylene (R-1270), and ammonia ($NH_3$, R-717).

The apparatus comprises a refrigeration circuit. The refrigeration circuit is configured for circulating the refrigerant fluid. The refrigeration circuit includes a first heat exchanger. The first heat exchanger is in heat exchange with an external environment (namely, provides heat exchange between the external environment and the refrigerant fluid). In a refrigeration mode, the first heat exchanger is configured for condensing the refrigerant fluid and, consequently, defines a condenser (in the following, the first heat exchanger is also indicated as condenser). The refrigeration circuit includes an expansion valve, configured for expanding the refrigerant fluid. The refrigeration circuit includes a second heat exchanger. The second heat exchanger is in heat exchange with a room of the recreational vehicle to be air-conditioned (namely, provides heat exchange between the room of the recreational vehicle and the refrigerant fluid). In the refrigeration mode, the second heat exchanger is configured for evaporating the refrigerant fluid and, consequently, defines an evaporator (in the following, the second heat exchanger is also indicated as evaporator). The refrigeration circuit includes a compressor, configured for compressing the refrigerant fluid.

In the refrigeration mode, the refrigerant fluid circulates from the compressor to the condenser, from the condenser to the expansion valve, from the expansion valve to the evaporator and from the evaporator back to the condenser. In particular, the evaporator has an inlet connected to the expansion valve and an outlet connected to the compressor. The condenser has an inlet connected to the compressor and an outlet connected to the expansion valve.

The apparatus further includes a leakage detection system. The leakage detection system includes a refrigerant fluid sensor, configured to detect a control parameter representative of a physical condition of the refrigerant fluid at the outlet of the evaporator or at the inlet of the condenser. The leakage detection system includes a control unit, connected to the refrigerant fluid sensor, and configured to receive (for example, in real time), the control parameter from the refrigerant fluid sensor. The control unit may include a PCB (printed circuit board).

The refrigerant fluid sensor may be, for example, a pressure sensor; in this case, the control parameter is representative of the pressure of the refrigerant fluid at the outlet of the evaporator or at the inlet of the condenser. Moreover, the refrigerant fluid sensor may be a temperature sensor; in this case, the control parameter is representative of the temperature of the refrigerant fluid at the outlet of the evaporator or at the inlet of the condenser.

According to an aspect of the present disclosure, the control unit is further connected to the compressor and is configured to receive from the compressor (for example, in real time), a compressor operation signal, representative of an operating status of the compressor. The control unit is configured to select reference values previously memorized in a database (which may be included in the apparatus or be remote), as a function of the compressor operation signal. The control unit is configured to compare the value (values) of the control parameter with the reference values, to generate a diagnostic parameter for assessing a leakage condition. The reference values provide a mapping of values to which the control parameter detected by the refrigerant fluid sensor is compared. For example, the reference values may include a minimum value and a maximum value for the control parameter; in case the control parameter is not comprised between the minimum and the maximum value, the leakage condition is assessed. In another example, the reference values may include an optimal value and a tolerance value for the control parameter; in case the control parameter is not comprised between optimal value minus the tolerance value and the optimal value plus the tolerance value, the leakage condition is assessed.

The leakage detection system may further include a room temperature sensor. The room temperature sensor is configured to detect a room temperature signal, representative of a room temperature in the room to be air-conditioned. The room temperature sensor is connected to the control unit.

The control unit is configured to receive in real time the room temperature signal from the room temperature sensor. The control unit is configured to select the reference values as a function of the room temperature signal (alternatively or additionally to as a function of the compressor operation signal).

In an embodiment, the leakage detection system further includes an outside environment temperature sensor. The outside environment temperature sensor is configured to detect an outside environment temperature signal, representative of an outside environment temperature in the outside environment (out of the recreational vehicle). The outside environment temperature sensor is connected to the control unit. The control unit may be configured to receive in real time the outside environment temperature signal from the outside environment temperature sensor. The control unit is configured to select the reference values as a function of the outside environment outside environment sensor (alternatively or additionally to as a function of the compressor operation signal and/or room temperature signal).

The control unit is connected (or connectable) to a memory. The memory may be included or not in the apparatus. The control unit is configured to store in the memory, for each of a plurality of successive time instants, the control parameter and/or the compressor operation signal received at the control unit. In particular, the plurality of successive time instants includes at least a preceding instant, which precedes the actual instant. The plurality of successive time instants may also include the actual instant. The control unit may be configured to compare the control parameter received in real time for the actual instant with the control parameter stored in the memory for the preceding instant, and to generate an alert signal as a function of a deviation of the control parameter received in real time for the actual time instant with respect to the control parameter stored in the memory for the preceding instant; in particular, the control unit may be configured to generate the alert signal if said deviation exceeds a reference threshold. The reference threshold is stored in the memory. Hence, the control unit may be configured to monitor a trend of the control parameter; this allows to promptly identify a leakage, as soon as it occurs.

The apparatus may include a monitor configured to display the diagnostic parameter (in particular, its value received in real time and/or its values at said plurality of time instants, providing a trend of the diagnostic parameter over time). Hence, the user may monitor the diagnostic parameter and switch off the apparatus and/or activate a safety procedure in case a leakage is assessed. Moreover, in at least one embodiment, the control unit may automatically command a stop of the apparatus as a function of the diagnostic parameter (for instance, by switching off the compressor).

The alert signal has the function to warn the user in case the control parameter is changing in an anomalous way (for instance, in case the pressure is decreasing too fast). Thus, the alert signal may constitute a clue that a leakage is present (although it may be indicative also of other defects). The alert signal may be displayed on the monitor, and/or may include a sound signal. It is here observed that the alert signal may define (coincide with) the diagnostic parameter, or may be a different signal.

In an embodiment, the alert signal may command a stop of the apparatus, which requires an action of the user to be reactivated (for instance, after having verified if a leakage is actually present by reading the diagnostic parameter).

The preceding instant may be a (single) initial time instant, wherein at each actual time instant the parameters which are received at the control unit in real time are compared with the ones stored in the memory for the (single) initial time instant (which remain the same). Alternatively, at each time instant of a plurality of successive time instants, the control unit may store in the memory an updated value of the parameters and compare the parameters received in real time with the ones stored in the memory for the instant which (immediately) precedes the actual time instant. In this case, a trend of the parameters over time is stored in the memory.

In at least an embodiment, the control unit is configured to select the reference threshold among a plurality of values stored in the database, as a function of the room temperature signal and/or of the outside temperature signal.

In at least an embodiment, the control unit is configured to select the reference threshold as a function of a difference between the compressor operation signal received in real time for the actual instant and the compressor operation signal stored in the memory for the preceding instant. It is here observed that the reference threshold may be selected as a function of the room temperature signal, and/or of the outside temperature signal, and/or of the compressor operation signal, and/or of the difference between the compressor operation signal for the actual instant and the compressor operation signal for the preceding instant.

According to an aspect of the present disclosure, the refrigerant fluid sensor is connected to the refrigeration circuit at the outlet of the evaporator. The leakage detection system may include an additional refrigerant fluid sensor, connected to the refrigeration circuit at the inlet of the condenser. The additional refrigerant fluid sensor is configured to detect an additional control parameter, representative of a physical condition of the refrigerant fluid at the inlet of the condenser.

The additional refrigerant fluid sensor may be, for example, a pressure sensor; in this case, the control parameter is representative of the pressure of the refrigerant fluid at the inlet of the condenser. Moreover, the additional refrigerant fluid sensor may be a temperature sensor; in this case, the control parameter is representative of the temperature of the refrigerant fluid at the inlet of the condenser.

The control unit may be further connected to the additional refrigerant fluid sensor. The control unit may be further configured to receive, in real time, the additional control parameter. Please observe that, in an embodiment, the additional refrigerant fluid sensor (at the inlet of the condenser) is provided and the refrigerant fluid sensor (at the outlet of the evaporator) is not provided.

In at least one embodiment, the control unit is configured to store in the memory, for each of the plurality of successive time instants, the additional control parameter. The control unit may be configured to generate the alert signal as a function of a (additional) deviation of the additional control parameter received in real time for the actual time instant with respect to the additional control parameter stored in the memory for the preceding instant. In particular, the control unit may be configured to generate the alert signal if said (additional) deviation exceeds a (additional) reference threshold. In at least an embodiment, the control unit is configured to select the (additional) reference threshold among a plurality of values stored in the database, as a function of the room temperature signal, and/or of the outside temperature signal, and/or of the compressor operation signal and/or of the difference between the compressor operation signal for the actual instant and the compressor operation signal for the preceding instant.

In at least one embodiment, the control unit is configured to select additional reference values previously memorized in the database, as a function of the compressor operation signal and/or the room temperature signal and/or of the outside temperature signal, and to compare the value of the control parameter with the reference values, to generate the diagnostic parameter for assessing the leakage condition.

In at least one embodiment, the control unit is configured to calculate a differential control parameter as a difference between the control parameter and the additional control parameter.

The control unit may be configured to select differential reference values previously memorized in the database, as a function of the compressor operation signal and/or of the room temperature signal and/or of the outside temperature signal, and to compare the differential control parameter with the reference values, to generate the diagnostic parameter. For example, the differential reference values may include a minimum value and a maximum value for the differential control parameter, or an optimal value and a tolerance value for the differential control parameter. The differential reference values may define the reference values, or being provided further to the reference values. It is here observed that the differential reference values depend on the status of the compressor (ON/OFF) and, consequently, may be selected on the basis of the compressor operation signal. In fact, when the compressor is switched off, the pressure of the refrigerant fluid is the same at the inlet of the condenser and at the outlet of the evaporator and, in absence of a leakage, has a value which varies with the temperature in the room and/or in the outside environment). When the compressor is switched on, the pressure of the refrigerant fluid is higher at the inlet of the condenser than at the outlet of the evaporator, and a difference between these pressures depends on the temperature in the room and/or in the outside environment.

The control unit may be configured store in the memory, for each of the plurality of successive time instants, the differential control parameter. The control unit may be configured to generate the alert signal as a function of a deviation of the differential control parameter calculated in real time for the actual time instant with respect to the differential control parameter stored in the memory for the preceding instant. In particular, the control unit may be configured to generate the alert signal if said deviation between the differential control parameter calculated in real time for the actual time instant and the differential control parameter stored in the memory for the preceding instant exceeds a differential reference threshold. In at least an embodiment, the control unit is configured to select the differential reference threshold among a plurality of values stored in the database, as a function of the room temperature signal and/or of the compressor operation signal and/or of the difference between the compressor operation signal for the actual instant and the compressor operation signal for the preceding instant and/or of the outside temperature signal.

According to an aspect of the present disclosure, the control unit is configured to calculate a leakage parameter, as a function of one or more of the following: control parameter, additional control parameter, differential control parameter, room temperature measured in the room to be air conditioned, outside environment temperature. The control unit is configured to compare the leakage parameter with a minimum and/or a maximum threshold previously memorized, to generate the diagnostic parameter. The minimum and/or a maximum threshold for the leakage parameter are fixed, namely they are not variable with the room temperature or the power absorbed by the compressor.

For example, the leakage parameter may be calculated as a difference between the pressure at the inlet of the condenser and the pressure at the outlet of the evaporator, the difference being divided by the pressure at the inlet of the condenser (or by the pressure at the outlet of the evaporator). In at least an embodiment, the control unit is configured to select the minimum and/or the maximum threshold among a plurality of values stored in the database, as a function of the room temperature signal and/or of the compressor operation signal and/or of the difference between the compressor operation signal for the actual instant and the compressor operation signal for the preceding instant and/or of the outside temperature signal.

According to an embodiment the present disclosure, the leakage detection system includes a power sensor (or current sensor) connected to the compressor and configured to measure a power (or current) absorbed by the compressor; in this case, the compressor operation signal may be representative of a power (or current) absorbed by the compressor. According to another embodiment, the compressor operation signal may be a binary parameter representative of a status of the compressor (ON or OFF).

In at least one embodiment, the apparatus comprises a four-way valve, connected to the refrigeration circuit and operable in a first position, to operate the apparatus in the refrigeration mode, and in a second position, to operate the apparatus in a heating mode.

In the heating mode, the first heat exchanger is configured for evaporating the refrigerant fluid and, consequently, works as an evaporator. In the heating mode, the second heat exchanger is configured for condensing the refrigerant fluid and, consequently, works as a condenser.

In the heating mode, the refrigerant fluid circulates from the compressor to the condenser (which is, in this mode, the second heat exchanger), from the condenser to the expansion valve, from the expansion valve to the evaporator (which is, in this mode, the first heat exchanger) and from the evaporator back to the condenser.

The control unit may be configured to select the reference values (and/or the additional reference values, and/or the differential reference values, and or the minimum and/or maximum threshold for the leakage parameter) among a plurality of values memorized in the database, also as a function of the four-way valve being in the first position or in the second position.

The present disclosure also provides a method for detecting a leakage of refrigerant fluid in a refrigeration circuit for (of) a recreational vehicle.

The method comprises a step of detecting a control parameter, representative of a physical condition (pressure or temperature) of the refrigerant fluid at the outlet of the evaporator or at the inlet of the condenser.

The method comprises a step of receiving in real time, at a control unit, the control parameter and a compressor operation signal, representative of an operating status of the compressor.

According to an aspect of the present disclosure, the method comprises a step of selecting reference values previously memorized in a database, as a function of the compressor operation signal; also, the method comprises a step of comparing the value of the control parameter with the reference values, and generating a diagnostic parameter for assessing a leakage condition.

The method may further comprise a step of detecting a room temperature signal, representative of a room temperature in the room to be air-conditioned, through a room temperature sensor. Then, the method comprises a step of receiving (for example, in real time) the room temperature signal at the control unit. In this case, the reference values may be selected also as a function of the room temperature signal.

The method may further comprise a step of detecting an outside environment temperature signal, representative of an outside environment temperature in the outside environment, through an outside environment temperature sensor. Then, the method comprises a step of receiving (for example, in real time) the outside environment temperature signal at the control unit. In this case, the reference values may be selected also as a function of the outside temperature environment signal.

In at least one embodiment, the method comprises a step of storing in a memory, for each of a plurality of successive time instants, the control parameter and the compressor operation signal received at the control unit. In particular, the plurality of successive time instants includes at least a preceding instant, which precedes an actual instant. The method may further comprise a step of comparing the control parameter received in real time for the actual instant with the control parameter stored in the memory for the preceding instant and generating an alert signal as a function of a deviation of the control parameter received in real time for the actual time instant with respect to the control parameter stored in the memory for the preceding instant. In particular, the alert signal is generated if the deviation exceeds a reference threshold. In at least one embodiment, the method may further include a step of selecting the reference threshold as a function of a difference between the compressor operation signal received in real time for the actual instant and the compressor operation signal stored in the memory for the preceding instant and/or as a function of the room temperature signal and/or of the outside environment temperature signal.

In at least one embodiment, the control parameter is representative of a physical condition of the refrigerant fluid at the outlet of the evaporator and the method comprises a step of detecting an additional control parameter, representative of a physical condition of the refrigerant fluid at the inlet of the condenser.

The method may further comprise a step of calculating a differential control parameter as a difference between the control parameter and the additional control parameter.

In at least one embodiment, the method comprises a step of selecting differential reference values previously memorized in the database, as a function of the compressor operation signal and/or of the room temperature signal, and/or of the outside environment temperature signal, and a step of comparing the differential control parameter with the reference values, to generate the diagnostic parameter.

According to one aspect of the present disclosure, the method comprises a step of calculating a leakage parameter, as a function of one or more of the following: control parameter, additional control parameter, differential control parameter, room temperature measured in the room to be air conditioned, the outside environment temperature measured in the outside environment. Thus, the method may comprise a step of comparing the leakage parameter with minimum and/or a maximum threshold previously memorized, to generate the diagnostic parameter. The method may also include a step of selecting the minimum and/or the maximum threshold among a plurality of values stored in the database, as a function of the room temperature signal and/or of the compressor operation signal and/or of the difference between the compressor operation signal for the actual instant and the compressor operation signal for the preceding instant and/or of the outside environment temperature signal.

The method may also comprise a step of calibration, including deriving the reference values and memorizing them in the database. The reference values are derived by operating the apparatus in a plurality of situations having a specific room temperature and/or power absorbed by the compressor and/or outside environment temperature, and detecting the values of the control parameter and/or of the additional control parameter in these situations. The detected values (eventually corrected by a certain tolerance) provide the reference values.

BRIEF DESCRIPTION OF DRAWINGS

This and other features of the invention will become more apparent from the following detailed description of a non-limiting example embodiment of it, with reference to the accompanying drawings, in which.

DETAILED DESCRIPTION OF EMBODIMENTS

With reference to the accompanying drawings, the numeral 1 denotes an air conditioning apparatus for recreational vehicles (in the following, the apparatus).

The air conditioning apparatus comprises a refrigeration circuit for circulating the refrigerant fluid. The refrigeration circuit includes a condenser 2, an expansion valve 3, an evaporator 4 and a compressor 5. It is here observed that the terms "condenser" and "evaporator" are referred to an operation of the refrigeration circuit in a refrigeration mode.

The air conditioning apparatus comprises a leakage detection system. The leakage detection system includes one or more of the following:

a refrigerant fluid sensor 72, connected to the refrigeration circuit at the outlet of the evaporator 4 (namely, in a branch of the circuit comprised between the evaporator 4 and the compressor 5), and configured to detect a temperature or a pressure of the refrigerant fluid;

an additional refrigerant fluid sensor 74, connected to the refrigeration circuit at the inlet of the condenser 2 (namely, in a branch of the circuit comprised between the condenser 2 and the compressor 5), and configured to detect a temperature or a pressure of the refrigerant fluid;

a power sensor (or current sensor) 73, connected to the compressor 5 and configured to measure an electrical power (or current) absorbed by the compressor 5.

The leakage detection system comprises a control unit 8, connected to the refrigerant fluid sensor 72, and/or to the additional refrigerant fluid sensor 74, and/or to the power sensor 73.

In particular, the refrigerant fluid sensor 72 (if provided) is configured to send to the control unit 8 a control parameter 720, representative of the temperature or of the pressure of the refrigerant fluid in the branch of the circuit comprised between the evaporator 4 and the compressor 5.

The additional refrigerant fluid sensor 74 (if provided) is configured to send to the control unit 8 an additional control parameter 740, representative of the temperature or of the pressure of the refrigerant fluid in the branch of the circuit comprised between the condenser 2 and the compressor 5.

Both the refrigerant fluid sensor 72 and the additional refrigerant fluid sensor 74 are pressure sensors, configured to detect a pressure value of the refrigerant fluid in the branch of the circuit comprised between the evaporator 4 and the compressor 5 or in the branch of the circuit comprised between the condenser 2 and the compressor 5, respectively.

The power sensor 73 (if provided) is configured to send to the control unit 8 a compressor operator signal 730, representative of an operating status of the compressor (in particular, in an embodiment, of the actual power absorbed by the compressor 5).

The leakage detection system further comprises a room temperature sensor 71, configured to detect a room temperature TO in the room of the recreational vehicle to be air conditioned. The room temperature sensor 71 is connected to the control unit 8 and is configured to send to the control unit 8 a room temperature signal 710, representative of the room temperature TO.

In an embodiment, the control unit 8 is connected to a database (which may be included or not in the apparatus), the database including a plurality of reference values. The control unit 8 is configured to select one or more reference values among said plurality, as a function of one or more of the following:

the compressor operator signal 730;
the room temperature signal 710.

In an embodiment, the control unit 8 is configured to compare the value of the control parameter 720 and/or of the additional control parameter 740 with the reference values, to generate a diagnostic parameter for assessing a leakage condition.

In an embodiment, the control unit 8 is configured to calculate a differential control parameter as a difference between the control parameter 720 and the additional control parameter 740.

In an embodiment, the control unit 8 configured to calculate a leakage parameter, as a function one or more of the following: control parameter 720, additional control parameter 740, room temperature TO, differential parameter.

In an embodiment, the control unit 8 is connected to a memory 81 (which may be included or not in the apparatus 1) and is configured to store in the memory 8, for at least for an initial time instant (or, for each of a plurality of successive time instant equally distanced from each other) or more of the following:

control parameter 720;
additional control parameter 740;
room temperature TO;
differential control parameter;
leakage parameter.

In an embodiment, the control unit 8 is configured to compare the control parameter 720 received in real time with the control parameter stored in the memory 81 for the initial time instant or for a preceding instant of the plurality of time instants, and to generate an alert signal in case a deviation between the control parameter 720 received in real time and the control parameter stored in the memory 81 exceeds a certain threshold (which may be selected by the memory as a function of the room temperature TO, and/or as a function of a difference between the room temperature TO at the actual time instant and the room temperature at the initial time instant, or at the preceding instant, and/or as a function of the compressor operator signal 730, and/or as a function of a difference between the compressor operator signal 730 at the actual time instant and the compressor operator signal 730 at the initial time instant, or at the preceding instant).

In an embodiment, the control unit 8 is configured to compare the additional control parameter 740 received in real time with the control parameter stored in the memory 81 for the initial time instant of for a preceding instant of the plurality of time instants, and to generate an alert signal in case a deviation between the additional control parameter 740 received in real time and the additional control parameter stored in the memory 81 exceeds a certain threshold (which may be selected by the memory as a function of the room temperature TO, or as a function of a difference between the room temperature TO at the actual time instant and the room temperature at the initial time instant, or at the preceding instant and/or as a function of the compressor operator signal 730, and/or as a function of a difference between the compressor operator signal 730 at the actual time instant and the compressor operator signal 730 at the initial time instant, or at the preceding instant).

In an embodiment, the control unit 8 is configured to compare the differential control parameter calculated in real time with the differential control parameter stored in the memory 81 for the initial time instant of for a preceding instant of the plurality of time instants, and to generate an alert signal in case a deviation between the differential control parameter calculated in real time and the differential control parameter stored in the memory 81 exceeds a certain threshold (which may be selected by the memory as a function of the room temperature TO, or as a function of a difference between the room temperature TO at the actual time instant and the room temperature at the initial time instant, or at the preceding instant and/or as a function of the compressor operator signal 730, and/or as a function of a difference between the compressor operator signal 730 at the actual time instant and the compressor operator signal 730 at the initial time instant, or at the preceding instant).

In an embodiment, the control unit 8 is configured to compare the leakage parameter calculated in real time with reference values (e.g. maximum and minimum threshold) and generate the diagnostic parameter and/or the alert signal as a function of said comparison (e.g. in case the leakage parameter exceeds the maximum threshold or decreases below the minimum threshold).

Figure 1:
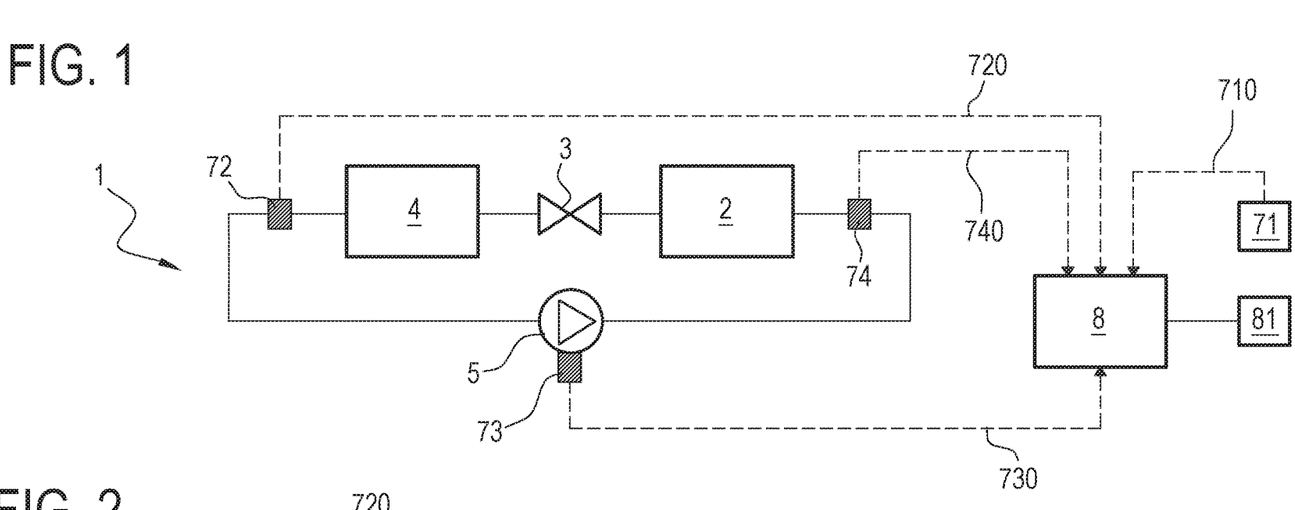
FIG. 1 illustrates an air conditioning apparatus according to the present disclosure.
Figure 2:
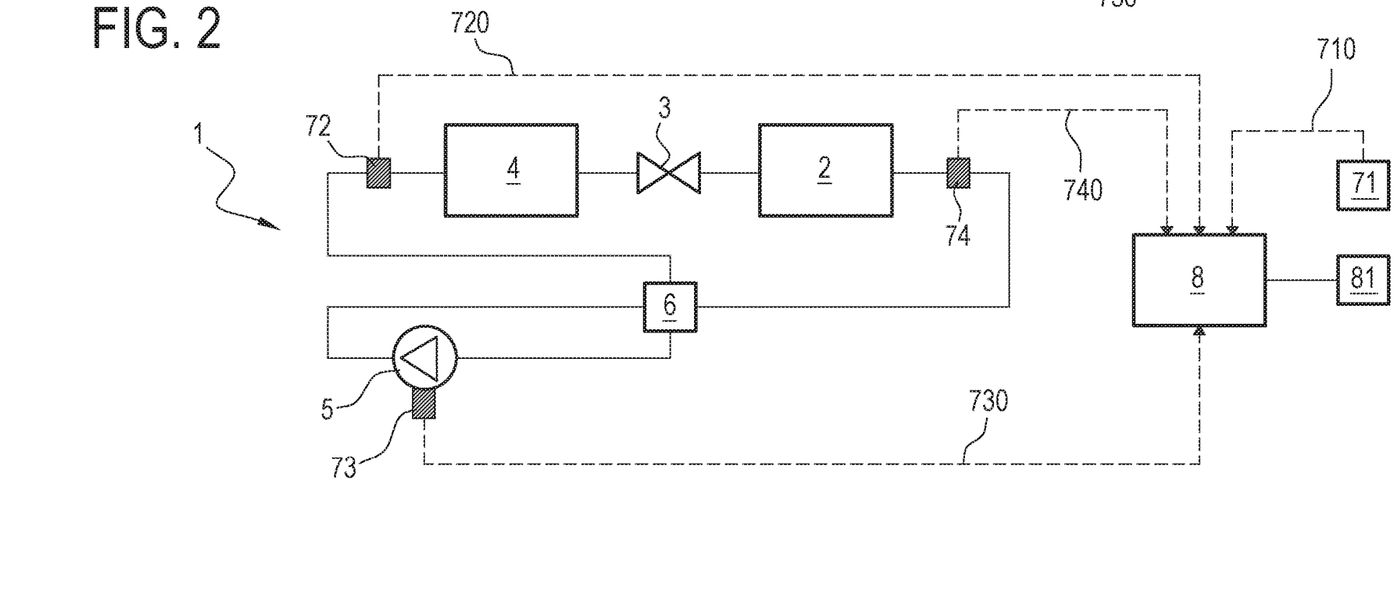
FIG. 2 illustrates a possible embodiment of the air conditioning apparatus of claim 1, wherein the apparatus is operable in a refrigeration mode and in a heating mode.
Figure 3:
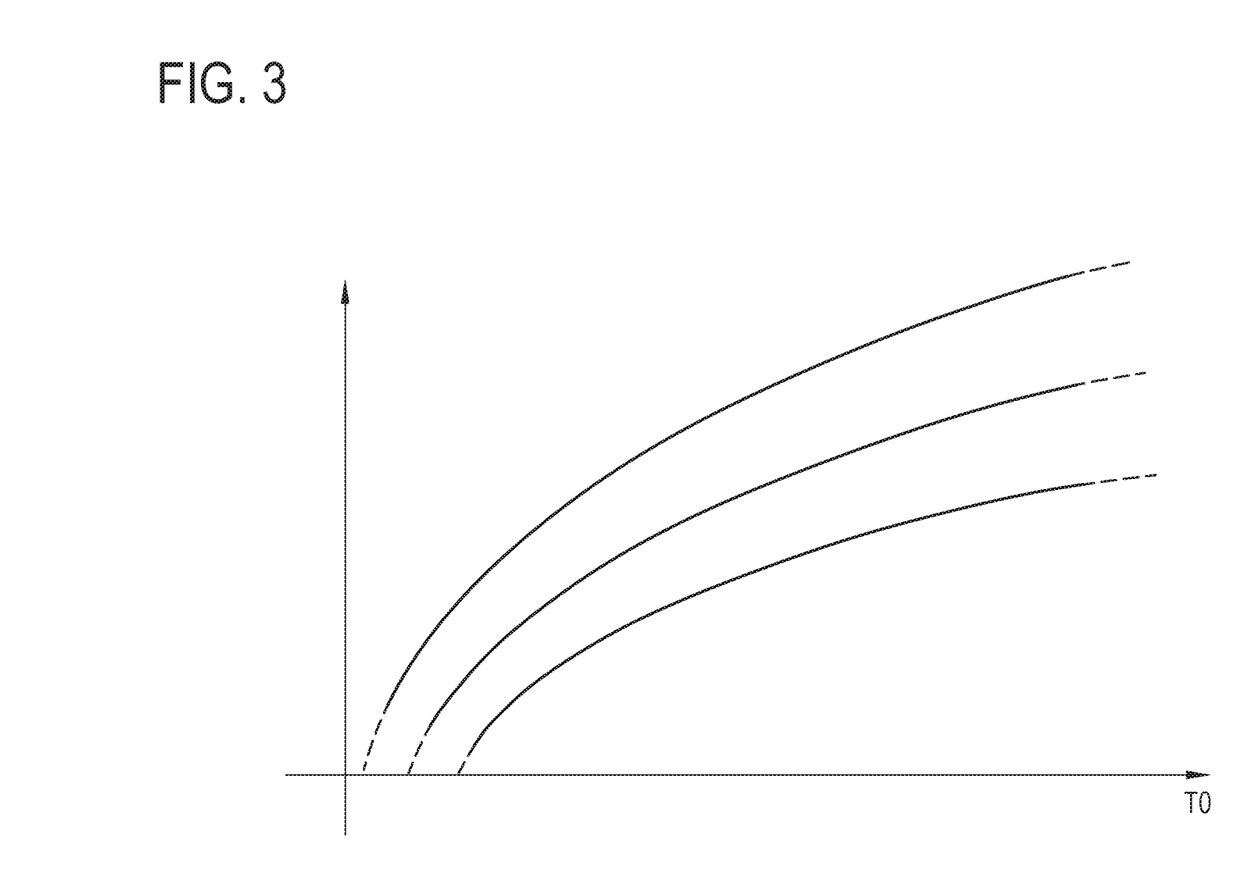
FIG. 3 illustrates possible variation of the control parameter as a function of the room temperature in the room to be air-conditioned and of the power absorbed by the compressor (in particular, each curve illustrated in FIG. 3 represents possible values of the control parameter for a certain power absorbed by the compressor, as a function of the room temperature).

In an embodiment, the apparatus 1 comprises a four-way valve 6. The four-way valve 6 is connected to the refrigeration circuit between the condenser 2 and the evaporator 4 (specifically, between the refrigerant fluid sensor 72 and the additional refrigerant fluid sensor 74). The four-way valve 6 has a first port connected to the branch of the refrigerant circuit connected to the evaporator 4, for receiving (in the refrigeration mode) the refrigerant fluid from the evaporator 4. The four-way valve 6 has a second port connected to the branch of the refrigerant circuit connected to the condenser 2, for sending (in the refrigeration mode) the refrigerant fluid to the condenser 2. It is here observed that, in the heating mode, the first port releases the refrigerant fluid and the second port receives the refrigerant fluid. The four-way valve has a third port, connected to the inlet of the compressor 5, for sending the refrigerant fluid to the compressor (both in the refrigeration mode and in the heating mode). The four-way valve 6 has a fourth port, connected to the outlet of the compressor 5, for receiving the refrigerant fluid from the compressor (both in the refrigeration mode and in the heating mode). The four-way valve 6 is operable in a first position, to receive the refrigerant fluid at the first port and releasing the (compressed) refrigerant fluid at the second port, and in a second position, to receive the refrigerant fluid at the second port and releasing the (compressed) refrigerant fluid at the first port. In the first position of the four-way valve, the apparatus is operated in the refrigeration mode and, in the second position of the four-way valve, the apparatus is operated in the heating mode.

The expansion valve 3 may be a mechanical valve or an electronic valve. In case it is an electronic valve, the control unit 8 is also connected to the expansion valve 3, to control the expansion valve 3. In an embodiment, the control unit 8 controls the expansion valve 3 as a function of the control parameter 720 detected at the outlet of the evaporator 4 (in particular, representing a pressure of the refrigerant fluid at the outlet of the evaporator 4) and as a function of the room temperature TO.

The invention claimed is:

1. An air conditioning apparatus for recreational vehicles, comprising:
    a refrigerant fluid;
    a refrigeration circuit for circulating the refrigerant fluid, said refrigeration circuit
    including:
    a condenser, in heat exchange with an external environment and configured to condense the refrigerant fluid;
    an expansion valve, configured to expand the refrigerant fluid;
    an evaporator, in heat exchange with a room of the recreational vehicle to be air-conditioned and configured to evaporating the refrigerant fluid;
    a compressor, configured to compress the refrigerant fluid, wherein the evaporator has an inlet connected to the expansion valve and an outlet connected to the compressor and the condenser has an inlet connected to the compressor and an outlet connected to the expansion valve;
    a leakage detection system, including:
    a refrigerant fluid sensor, configured to detect a control parameter representative of a physical condition of the refrigerant fluid at the outlet of the evaporator or at the inlet of the condenser;
    a control unit, connected to the refrigerant fluid sensor, wherein the control unit is further connected to the compressor and is configured to:
    receive, in real time, the control parameter from the refrigerant fluid sensor and a compressor operation signal, representative of an operating status of the compressor, from the compressor,
    select reference values previously memorized in a database, as a function of the compressor operation signal,
    compare the value of the control parameter with the reference values, to generate a diagnostic parameter for assessing a leakage condition.

2. The air conditioning apparatus of claim 1, wherein the leakage detection system further comprises a room temperature sensor, configured to detect a room temperature signal, representative of a room temperature in the room to be air-conditioned, wherein the control unit is configured to receive in real time the room temperature signal from the room temperature sensor and to select the reference values also as a function of the room temperature signal.

3. The air conditioning apparatus of claim 2, further comprising a memory, wherein the control unit is connected to the memory and is configured to store in the memory, for each of a plurality of successive time instants, the control parameter and the compressor operation signal received at the control unit.

4. The air conditioning apparatus of claim 3, wherein the plurality of successive time instants includes at least a preceding instant, which precedes an actual instant, and wherein the control unit is configured to compare the control parameter received in real time for the actual instant with the control parameter stored in the memory for the preceding instant and to generate an alert signal as a function of a deviation of the control parameter received in real time for the actual time instant with respect to the control parameter stored in the memory for the preceding instant.

5. The air conditioning apparatus of claim 4, wherein the control unit is configured to generate the alert signal if said deviation exceeds a reference threshold, wherein the control unit is configured to select the reference threshold as a function of a difference between the compressor operation signal received in real time for the actual instant and the compressor operation signal stored in the memory for the preceding instant.

6. The air conditioning apparatus of claim 1, wherein the refrigerant fluid sensor is connected to the refrigeration circuit at the outlet of the evaporator, and wherein the leakage detection system includes an additional refrigerant fluid sensor, connected to the refrigeration circuit at the inlet of the condenser, and configured to detect an additional control parameter representative of a physical condition of the refrigerant fluid at the inlet of the condenser, wherein the control unit is connected to the additional refrigerant fluid sensor to receive, in real time, the additional control parameter and is configured to calculate a differential control parameter as a difference between the control parameter and the additional control parameter.

7. The air conditioning apparatus of claim 6, wherein the control unit is configured to select differential reference values previously memorized in the database, as a function of the compressor operation signal, and to compare the differential control parameter with the differential reference values, to generate the diagnostic parameter.

8. The air conditioning apparatus of claim 7, wherein the control unit is configured to calculate a leakage parameter, as a function of the differential control parameter and one or more of the following: control parameter, additional control parameter, room temperature measured in the room to be air conditioned, and compare the leakage parameter with minimum and/or a maximum threshold previously memorized, to generate the diagnostic parameter.

9. The air conditioning apparatus of claim 1, wherein the refrigerant fluid sensor is a pressure sensor.

10. The air conditioning apparatus of claim 9, wherein the control parameter is representative of a pressure of the refrigerant fluid at the outlet of the evaporator, and wherein the leakage detection system includes an additional refrigerant fluid sensor, which is a pressure sensor, configured to detect an additional control parameter representative of a pressure of the refrigerant fluid at the inlet of the condenser.

11. The air conditioning apparatus of claim 1, wherein the leakage detection system includes a power sensor connected to the compressor and configured to measure a power absorbed by the compressor, wherein the compressor operation signal is representative of the power absorbed by the compressor.

12. The air conditioning apparatus of claim 1, comprising a four-way valve, connected to the refrigeration circuit and operable in a first position, to operate the apparatus in a refrigeration mode, and in a second position, to operate the apparatus in a heating mode, wherein the control unit is configured to select the reference values also as a function of the four-way valve being in the first position or in the second position.

13. A method for detecting a leakage of refrigerant fluid in a refrigeration circuit for a recreational vehicle, wherein the refrigeration circuit includes a condenser, in heat exchange with an external environment, an expansion valve, an evaporator, in heat exchange with a room of the recreational vehicle to be air-conditioned, a compressor, wherein the method comprises the following steps:

detecting a control parameter, representative of a physical condition of the refrigerant fluid at an outlet of the evaporator or at an inlet of the condenser;

receiving in real time, at a control unit the control parameter and a compressor operation signal, representative of an operating status of the compressor, selecting reference values previously memorized in a database, as a function of the compressor operation signal, comparing the value of the control parameter with the reference values, and generating a diagnostic parameter for assessing a leakage condition.

14. The method of claim 13, wherein the control parameter is representative of a physical condition of the refrigerant fluid at the outlet of the evaporator, and wherein the method further comprises a step of detecting an additional control parameter, representative of a physical condition of the refrigerant fluid at the inlet of the condenser and a step of calculating a differential control parameter as a difference between the control parameter and the additional control parameter.

15. The method of claim 13, wherein the control parameter is representative of a pressure of the refrigerant fluid.

* * * * *